(12) United States Patent
Stroh

(10) Patent No.: US 7,305,977 B1
(45) Date of Patent: Dec. 11, 2007

(54) SYSTEM FOR CONTROLLING REGENERATION OF LEAN $NO_X$ TRAPS

(75) Inventor: David J. Stroh, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/656,928

(22) Filed: Jan. 23, 2007

Related U.S. Application Data

(60) Provisional application No. 60/842,511, filed on Sep. 5, 2006.

(51) Int. Cl.
*F02D 41/14* (2006.01)

(52) U.S. Cl. .................. 123/679; 123/681; 701/104

(58) Field of Classification Search ................ 123/679, 123/681; 701/104
See application file for complete search history.

(56) References Cited

U.S. PATENT DOCUMENTS

| | | | | |
|---|---|---|---|---|
| 6,543,219 | B1 * | 4/2003 | Surnilla | 60/285 |
| 6,745,747 | B2 * | 6/2004 | Surnilla | 123/672 |
| 7,165,399 | B2 * | 1/2007 | Stewart | 701/104 |

* cited by examiner

*Primary Examiner*—Erick Solis

(57) ABSTRACT

A control system and method for controlling torque output of an engine include an air control module that receives an actual airflow and a desired airflow and outputs an adjusted actual airflow based on the actual airflow and the desired airflow. A fuel control module receives the adjusted actual airflow and controls fuel output based on the adjusted actual airflow, a ratio ($\lambda$) of an operating air-fuel mixture to an ideal air-fuel mixture, and an operating curve ($\lambda_{traj}$).

20 Claims, 3 Drawing Sheets

SYSTEM FOR CONTROLLING REGENERATION OF LEAN NO$_X$ TRAPS

CROSS-REFERENCE TO RELATED APPLICATIONS

This application claims the benefit of U.S. Provisional Application No. 60/842,511, filed on Sep. 5, 2006. The disclosure of the above application is incorporated herein by reference.

FIELD

The present disclosure relates to internal combustion engines, and more particularly to a system for controlling the regeneration of a lean NO$_x$ trap.

BACKGROUND

The statements in this section merely provide background information related to the present disclosure and may not constitute prior art.

The engine controls the air-fuel mixture to achieve an ideal air-fuel mixture ratio (stoichiometric ratio). At the optimum stoichiometric ratio, all of the fuel is burned using all of the oxygen in the air. For internal combustion engines, the stoichiometric ratio is about 14.7:1. In other words, for each pound of gasoline, 14.7 pounds of air is burned. The air-fuel mixture varies from the optimum stoichiometric ratio during driving. Sometimes the air-fuel mixture is lean (an air-to-fuel mixture higher than 14.7) and other times the air-fuel mixture is rich (an air-to-fuel mixture lower than 14.7).

Vehicle engines produce oxides of nitrogen (NOx) as a component of vehicle emissions. In particular, lean-burn gasoline and diesel engines tend to produce higher levels of NOx than conventional stoichiometric gasoline engines.

In an effort to reduce NOx levels in vehicle emissions, manufacturers employ emissions control systems with engine sensors and NOx storage catalysts, sometimes referred to as Lean NOx traps (LNTs). The NOx storage catalysts absorb and decompose the NOx with combustible gases such as carbon monoxide (CO) or hydrocarbon (HC). While reducing NOx levels, these systems tend to increase the level of hydrocarbons in vehicle emissions.

LNTs require periodic intervals of rich exhaust gas to regenerate the stored NOx and convert it into harmless byproducts. This control of the air-fuel ratio in a diesel engine can cause torque disturbance during rich operation.

SUMMARY

A control system and method for controlling torque output of an engine include an air control module that receives an actual airflow and a desired airflow and outputs an adjusted actual airflow based on the actual airflow and the desired airflow. A fuel control module receives the adjusted actual airflow and controls fuel output based on the adjusted actual airflow, a ratio ($\lambda$) of an operating air-fuel mixture to an ideal air-fuel mixture, and an operating curve ($\lambda_{traj}$).

In other features, a reference module generates the $\lambda_{traj}$ based on the $\lambda$ and a desired $\lambda$ ($\lambda_{des}$). The reference module generates the $\lambda_{traj}$ by one of decaying the $\lambda$ to the $\lambda_{des}$ and incrementing the $\lambda$ to the $\lambda_{des}$. The desired operation of the engine. The lean operation corresponds to the ideal air to fuel ratio exceeding 14.7 and the rich operation corresponds to the ideal air to fuel ratio below 14.7.

In other features, the air control module includes an air feed forward module. The air feed forward module controls boost based on the desired mass airflow. The air control module includes an air feedback module. The air feedback module adjusts exhaust gas recirculation (EGR) and throttle based on the desired airflow and the actual airflow. The fuel control module includes a fuel feed forward module that controls a feed forward fuel quantity supplied to the engine based on the adjusted actual airflow, the $\lambda_{traj}$, and an air to fuel ratio model. The fuel control module includes a delay module and a fuel feedback module. The delay module retains the $\lambda_{traj}$ for an initial period of time. The fuel feedback module determines a delta fuel quantity based on the $\lambda$ and said $\lambda_{traj}$. The initial period of time compensates for a lapse in time between supplying the fuel feed forward to the engine and communicating with a $\lambda$ sensor.

In other features, the control system and method receive a mode input that corresponds to one of lean operation of the engine and rich operation of the engine. The lean operation corresponds to the ideal air to fuel ratio exceeding 14.7 and the rich operation corresponds to the ideal air to fuel ratio below 14.7.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
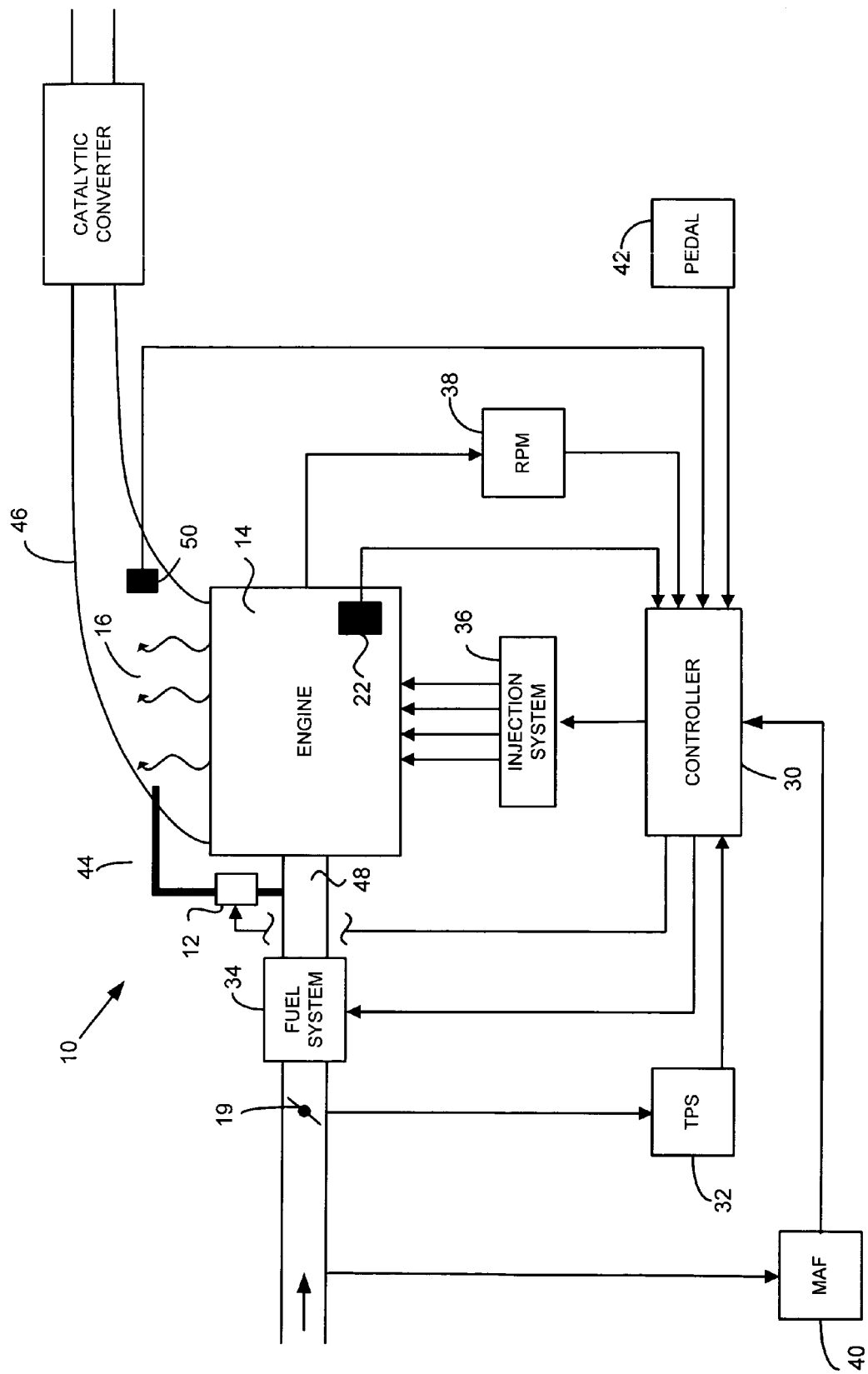
FIG. 1 is a block diagram of an engine control system including a lambda sensor according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine control system 10 of an engine 14 is shown. A controller 30 communicates with various components of the engine control system 10 including, but not limited to, a throttle position sensor 32 (TPS), a fuel system 34, an injection system 36, and the engine speed sensor 34. The engine speed sensor 34 determines an engine speed in rotations per minute (RPM). The controller 30 receives a mass air flow (MAF) from the MAF sensor 40 and uses the information to determine air flow into the engine 14. The air flow data is then used to calculate fuel delivery from the fuel system 34 to the engine 14. The controller 30 further communicates with an ignition (not shown) or the injection system 36 to determine ignition spark or injection timing. The controller 30 may receive additional inputs from other components in the engine control system 10, including an accelerator pedal 42.

In an exhaust gas recirculation (EGR) system, a conduit 44 connects the exhaust manifold 46 to the intake manifold 48. An EGR valve 12 that is positioned along the conduit 44 and meters EGR according to input from the controller 30. In the preferred embodiment, a lambda (λ) sensor 50 or exhaust gas oxygen sensor determines a ratio of the operating air-fuel mixture to the stoichiometric operating condition (λ). The λ sensor 50 communicates λ values to the controller 30. The controller 30 may communicate with the EGR valve 12 or a boost mechanism (not shown) in response to the data from the λ sensor 50. The controller 30 adjusts the EGR valve 12 and/or the boost mechanism to correct performance thereof.

Figure 2:
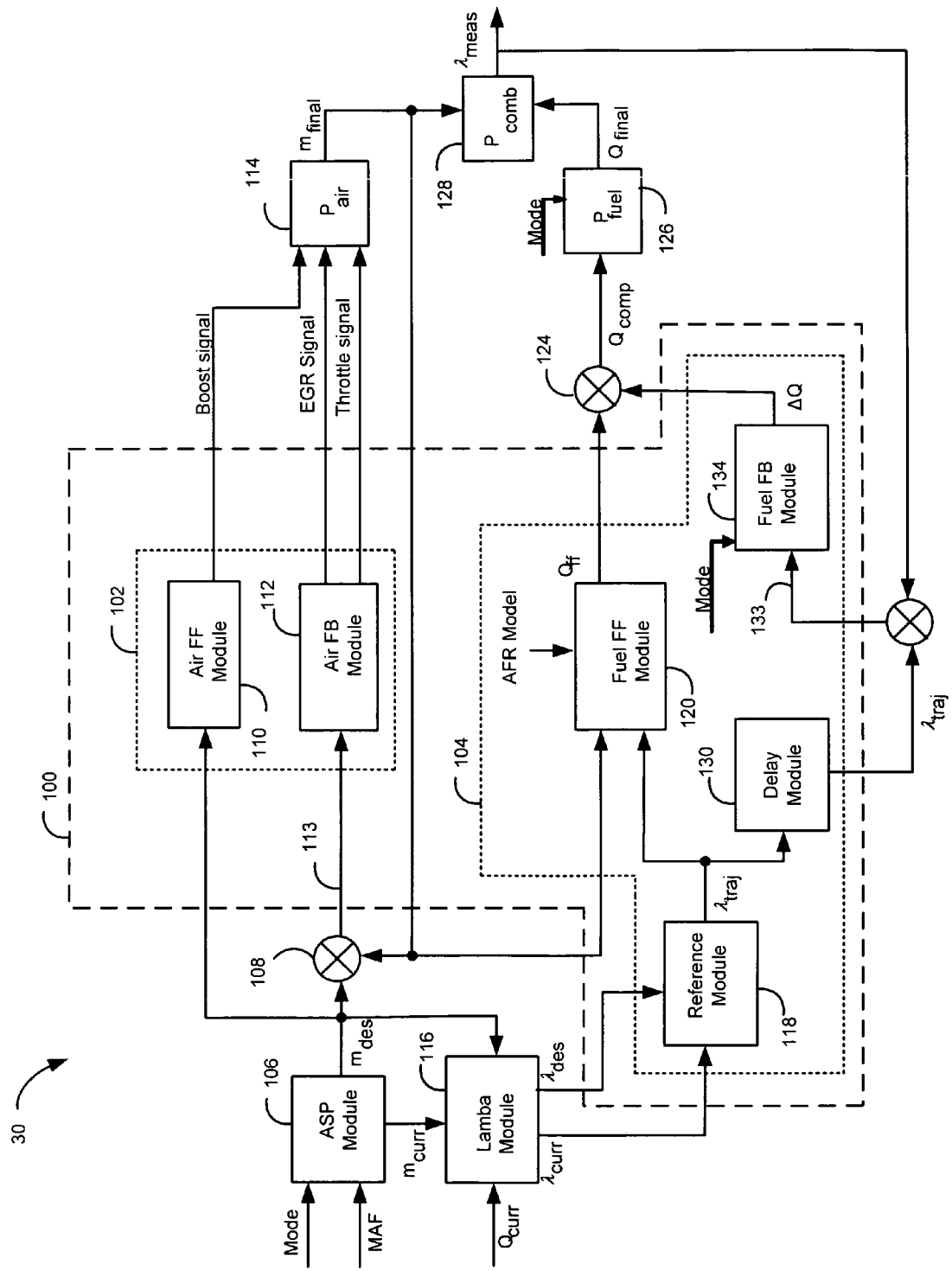
FIG. 2 is a functional block diagram of a controller according to the present invention.

Referring now to FIG. 2, the controller 10 includes an air set point (ASP) module 106 that receives a MAF signal from the MAF sensor 40 and a mode signal. The mode signal indicates whether the engine 14 requires a switch from the current air-fuel (A/F) operation. For example, the mode signal may include a required change from a lean A/F operation to a rich A/F operation. Conversely, the required change may be from a rich A/F operation to a lean A/F operation. The ASP module 106 determines a current mass airflow ($m_{curr}$) and a desired mass airflow ($m_{des}$). The $m_{curr}$ represents the airflow at the current A/F operation of the engine 14 prior to a mode switch, and $m_{des}$ represents the airflow corresponding to desired A/F. The $m_{curr}$ is based on the MAF.

A regeneration control system 100 includes an air control module 102 that controls airflow delivered to the engine 14 and a fuel control module 104 that controls fuel delivered to the engine 14. The air control module 102 includes an air feed forward (air FF) module 110 that outputs a boost signal based on the $m_{des}$. The boost signal, an EGR valve signal, and a throttle signal command the air control plant ($P_{air}$) device 114 which produces the plant airflow ($m_{final}$). The $P_{air}$ device 114 is a combination of air actuators including, but not limited to, an EGR valve 12, a throttle valve 19, and a boost mechanism (not shown). In various embodiments, the boost mechanism may include, but is not limited to, a variable geometry turbo and/or a fixed geometry turbo.

The air control module 104 includes an air feedback loop that provides air closed loop control to the regeneration control system 100. An air feedback (air FB) module 112 receives an error signal 113 and outputs the EGR signal and throttle signal to adjust the EGR valve 12 and throttle valve 19, respectively, to compensate for the disparity between the $m_{final}$ and $m_{des}$. During the operation of the engine 14, a first comparator 108 compares the $m_{final}$ to the $m_{des}$ and outputs the difference, the error signal 113, to the air FB module 112. In an exemplary embodiment, the air FB module 112 can be, but is not limited to, a proportional-integral-derivative controller (PID) controller.

A lambda module 116 calculates and outputs a current lambda ($\lambda_{curr}$) value and a desired lambda ($\lambda_{des}$) value to a reference module 118. λ values represent a ratio of an operating A/F mixture to the stoichiometric operating condition described above. The $\lambda_{curr}$ value is based on $m_{curr}$ and a current fuel quantity ($Q_{curr}$) being utilized by the engine 14. The $\lambda_{des}$ can be a predetermined value based on operating at rich or lean A/F conditions or can be determined based on the $\lambda_{curr}$.

The reference module generates a lambda trajectory curve ($\lambda_{traj}$) based on the $\lambda_{curr}$ and the $\lambda_{des}$. The reference module 118 shapes the $\lambda_{des}$ by either decaying the $\lambda_{curr}$ to the $\lambda_{des}$ when transitioning from a lean to rich operation or by incrementing the $\lambda_{curr}$ to the $\lambda_{des}$ when transitioning from rich to lean operation of the engine 14. In an exemplary embodiment, the transition can be accomplished exponentially to limit the amount of torque disturbance. The $\lambda_{traj}$ serves as input to a fuel feed forward (fuel FF) module 120 and a delay module 130. The fuel FF module 120 outputs a feed forward fuel quantity ($Q_{ff}$) command based on the $\lambda_{traj}$, the $m_{final}$ signal, and an A/F ratio (AFR) model.

The $Q_{ff}$ and a fuel quantity differential ($\Delta Q$) are summed at a first summing junction 124. In various embodiments, the $Q_{ff}$ may either be incremented or decremented by the $\Delta Q$. A fuel plant ($P_{fuel}$) device 126 simultaneously receives the mode input. The $P_{fuel}$ device 126 schematically represents mechanisms for the addition of fuel including, but not limited to, fuel injectors (not shown) of the engine 14. In various embodiments, a compensated fuel quantity ($Q_{comp}$) can be added directly to the main injection pulse of the injector and/or by additional pulse injections such as post injections.

The mode input signals the need for the $P_{fuel}$ device 126 to change operating modes from $Q_{curr}$ operation to a desired fuel quantity ($Q_{des}$) operation. In various embodiments, the $P_{fuel}$ device 126 is not enabled during lean operation. As a result, during lean operation, a predetermined lean fuel quantity is provided by controller 30.

The $P_{fuel}$ device 126 injects a final fuel quantity ($Q_{final}$) based on the $Q_{comp}$ outputted by the first summing junction 124. A combustion plant ($P_{comb}$) device 128 outputs a measured lambda ($\lambda_{meas}$) that is detected by the λ sensor 50. The $\lambda_{meas}$ is electrically communicated to a second comparator 132.

The control process also utilizes a fuel feedback loop that provides fuel closed loop control to the regeneration control system 100 by adjusting the $Q_{ff}$ command to correct for any error. A delay module 130 holds the $\lambda_{traj}$ value for an initial period of time prior to outputting the $\lambda_{traj}$ to the second comparator 132. The time delay associated with the delay module 130 compensates for the lapse in time between injecting the $Q_{ff}$ into the cylinders (not shown) of the $P_{comb}$ device 128 and receiving a signal from the λ sensor 50 indicating that the exhaust gas 16 has been expelled to the λ sensor 50.

The second comparator 132 compares the $\lambda_{meas}$ and the $\lambda_{traj}$. A fuel error signal 133 indicating the difference between the $\lambda_{traj}$ and the $\lambda_{meas}$ is input into a fuel feedback (fuel FB) module 134. Prior to receiving the fuel error signal 133, the fuel FB module 134 is commanded by the mode input to change modes of operation. In an exemplary embodiment, the fuel FB module 134 can be, but is not limited to, a PID controller. The fuel FB module 134 determines the $\Delta Q$ based on the fuel error signal 133.

Figure 3:
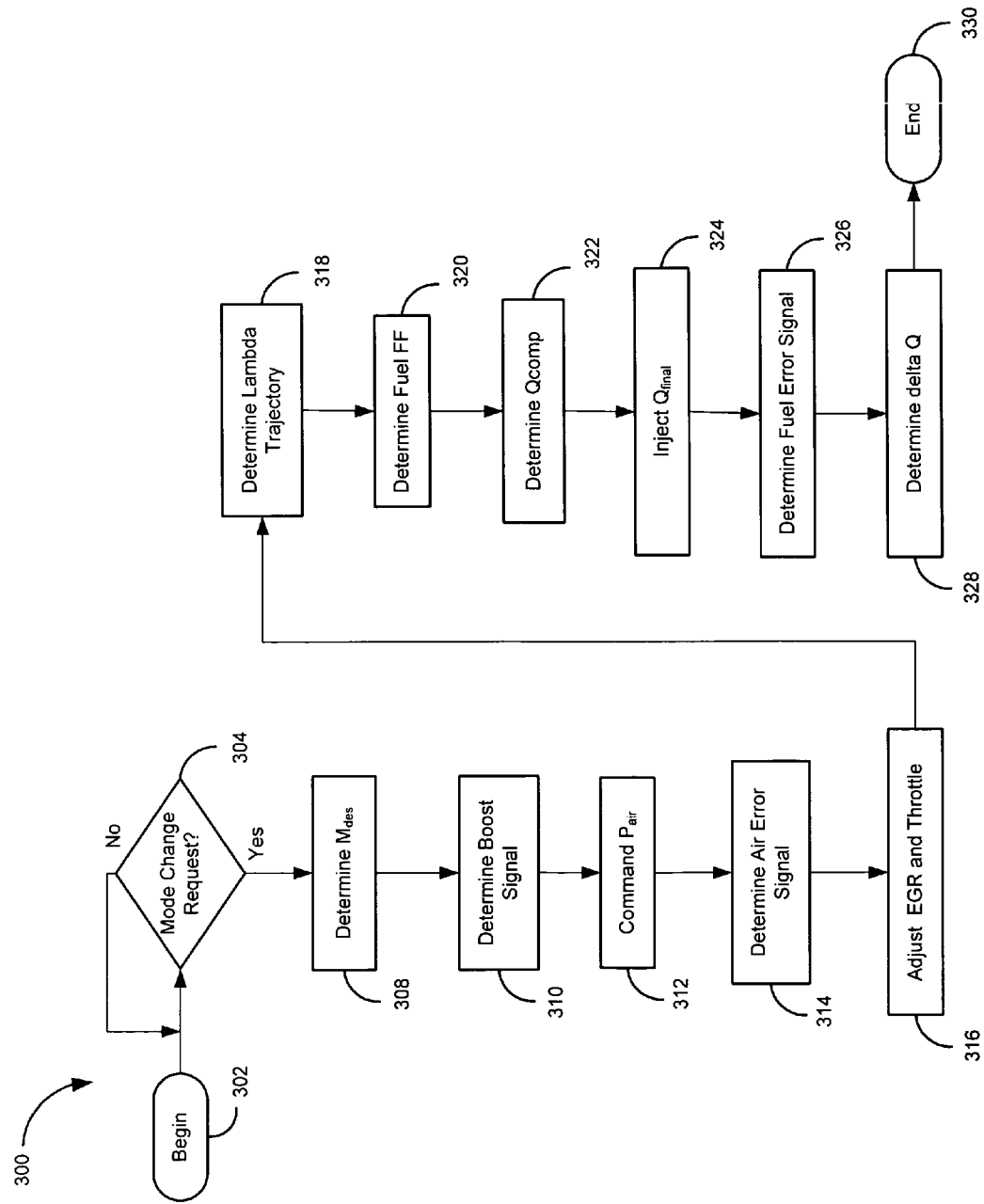
FIG. 3 is a flowchart illustrating a method of controlling regeneration of a NOx trap according to the present invention.

Referring now to FIG. 3, a method 300 of controlling the regeneration of a NOx trap will be discussed in more detail. The ASP module 106 begins the method 300 at 302. At 304, the ASP module 106 determines whether the engine 14 requires changing the A/F operation. If the engine 14 does not require a change of A/F operation, the ASP module 106 returns to 304. If engine 14 does require a change of the A/F operation, the ASP module 106 proceeds to 308. The ASP module 106 determines the $m_{des}$ needed by the engine 14 that corresponds to the change of A/F operation.

In 310, the air FF module 110 determines the boost pressure signal that commands the boost mechanism of the engine 14. The air control module 102 commands the $P_{air}$ device 114 based on the boost pressure signal, the EGR signal, and the throttle signal in 312. In 314, the first comparator 108 determines the air error signal based on $m_{final}$ and $m_{des}$. In 316, the air FB module 112 determines the EGR signal and the throttle signal based on the air correction signal.

In 318, the λ module 116 determines the $\lambda_{traj}$ based on the $\lambda_{curr}$ and $\lambda_{des}$. In 320, the fuel FF module 120 determines the $Q_{ff}$ based on the $\lambda_{traj}$. The first summing junction 124 determines the $Q_{comp}$ based on the sum of the $Q_{ff}$ and the $\Delta Q$ in 322. In 324, the $P_{fuel}$ device 126 delivers $Q_{final}$ based on the $Q_{comp}$. The second comparator 132 determines the fuel error signal in 326 based on the $\lambda_{traj}$ and the $\lambda_{meas}$ outputted by the λ sensor 50. In 328, fuel FB module 134 determines $\Delta Q$ based on the fuel error signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for controlling torque output of an engine, comprising:
   an air control module that receives an actual airflow and a desired airflow and outputs an adjusted actual airflow based on said actual airflow and said desired airflow; and
   a fuel control module that receives said adjusted actual airflow and controls fuel output based on said adjusted actual airflow, a ratio (λ) of an operating air-fuel mixture to an ideal air-fuel mixture, and an operating curve ($\lambda_{traj}$).

2. The control system of claim 1 further comprising:
   a reference module that generates said $\lambda_{traj}$ based on said λ and a desired λ ($\lambda_{des}$).

3. The control system of claim 2 wherein said reference module generates said $\lambda_{traj}$ by one of decaying said λ to said $\lambda_{des}$ and incrementing said λ to said $\lambda_{des}$.

4. The control system of claim 1 wherein said air control module includes an air feed forward module; and
   wherein said air feed forward module controls boost based on said desired mass airflow.

5. The control system of claim 4 wherein said air control module includes an air feedback module; and
   wherein said air feedback module adjusts exhaust gas recirculation (EGR) and throttle based on said desired airflow and said actual airflow.

6. The control system of claim 5 wherein said fuel control module includes a fuel feed forward module that controls a feed forward fuel quantity supplied to said engine based on said adjusted actual airflow, said $\lambda_{traj}$, and an air to fuel ratio model.

7. The control system of claim 6 wherein said fuel control module includes a delay module and a fuel feedback module;
   wherein said delay module retains said $\lambda_{traj}$ for an initial period of time;
   wherein said fuel feedback module determines a delta fuel quantity based on said λ and said $\lambda_{traj}$.

8. The control system of claim 7 wherein said initial period of time compensates for a lapse in time between supplying said fuel feed forward to said engine and communicating with a λ sensor.

9. The control system of claim 2 wherein said desired airflow and said $\lambda_{des}$ are based on one of lean operation of said engine and rich operation of said engine;
   wherein said lean operation corresponds to said ideal air to fuel ratio exceeding 14.7 and said rich operation corresponds to said ideal air to fuel ratio below 14.7.

10. The control system of claim 1 wherein said control system receives a mode input that corresponds to one of lean operation of said engine and rich operation of said engine;
    wherein said lean operation corresponds to said ideal air to fuel ratio exceeding 14.7 and said rich operation corresponds to said ideal air to fuel ratio below 14.7.

11. A method for controlling torque output of an engine, comprising:
    controlling an adjusted airflow to said engine based on a desired airflow and an actual airflow; and
    controlling a second final fuel quantity to said engine based on said adjusted airflow, a ratio (λ) of an operating air-fuel mixture to an ideal air-fuel mixture, and an operating curve ($\lambda_{traj}$).

12. The method of claim 11 further comprising:
    generating said $\lambda_{traj}$ based on said λ and a desired λ ($\lambda_{des}$).

13. The method of claim 12 wherein said $\lambda_{traj}$ is generated by one of decaying said λ to said $\lambda_{des}$ and incrementing said λ to said $\lambda_{des}$.

14. The method of claim 11 further comprising:
    controlling boost based on said desired mass airflow.

15. The method of claim 14 further comprising:
    controlling exhaust gas recirculation (EGR) and throttle based on said desired airflow and said actual airflow.

16. The method of claim 15 further comprising:
    controlling a feed forward fuel quantity supplied to said engine based on said adjusted airflow, said $\lambda_{traj}$, and an air to fuel ratio model.

17. The method of claim 16 further comprising:
    retaining said $\lambda_{traj}$ for an initial period of time; and
    determining a delta fuel quantity based on said λ and said $\lambda_{traj}$.

18. The method of claim 17 wherein said initial period of time compensates for a lapse in time between supplying said fuel feed forward to said engine and communicating with a λ sensor.

19. The method of claim 12 wherein said desired airflow and said $\lambda_{des}$ are based on one of lean operation of said engine and rich operation of said engine;
    wherein said lean operation corresponds to said ideal air to fuel ratio exceeding 14.7 and said rich operation corresponds to said idea air to fuel ratio below 14.7.

20. The method of claim 11 wherein said method receives a mode input that corresponds to one of lean operation of said engine and rich operation of said engine;
    wherein said lean operation corresponds to said ideal air to fuel ratio exceeding 14.7 and said rich operation corresponds to said ideal air to fuel ratio below 14.7.

* * * * *